United States Patent
Itagi et al.

(10) Patent No.: US 7,580,602 B2
(45) Date of Patent: Aug. 25, 2009

(54) BEAM APODIZATION FOR A PLANAR SOLID IMMERSION MIRROR

(75) Inventors: Amit Vasant Itagi, Pittsburgh, PA (US); William Albert Challener, Sewickley, PA (US)

(73) Assignee: Seagate Technology LLC, Scotts Valley, CA (US)

(*) Notice: Subject to any disclaimer, the term of this patent is extended or adjusted under 35 U.S.C. 154(b) by 10 days.

(21) Appl. No.: 11/856,151

(22) Filed: Sep. 17, 2007

(65) Prior Publication Data
US 2009/0074358 A1    Mar. 19, 2009

(51) Int. Cl.
G02B 6/34 (2006.01)
G02B 6/10 (2006.01)
G11B 7/00 (2006.01)
G11B 7/135 (2006.01)

(52) U.S. Cl. .................. 385/37; 385/129; 369/112.27
(58) Field of Classification Search ......... 385/129–132, 385/31, 33, 34, 35, 37, 39; 369/112.27
See application file for complete search history.

(56) References Cited

U.S. PATENT DOCUMENTS

| | | | |
|---|---|---|---|
| 5,864,430 A | 1/1999 | Dickey et al. | |
| 6,128,134 A | 10/2000 | Feldman et al. | |
| 6,285,813 B1 | 9/2001 | Schultz et al. | |
| 6,795,630 B2 | 9/2004 | Challener et al. | |
| 6,944,112 B2 | 9/2005 | Challener | |
| 6,980,374 B1 | 12/2005 | Schlesinger | |
| 7,027,699 B2 * | 4/2006 | Tao et al. | 385/126 |
| 7,027,700 B2 | 4/2006 | Challener | |
| 7,088,483 B1 | 8/2006 | Efimov | |
| 2005/0041950 A1 | 2/2005 | Rottmayer et al. | |
| 2005/0052771 A1 | 3/2005 | Rausch et al. | |
| 2005/0078565 A1 | 4/2005 | Peng et al. | |
| 2005/0111309 A1 | 5/2005 | Peng | |
| 2005/0122850 A1 | 6/2005 | Challener et al. | |
| 2005/0135008 A1 * | 6/2005 | Challener et al. | 360/128 |
| 2005/0190682 A1 | 9/2005 | Gage et al. | |
| 2005/0265139 A1 | 12/2005 | Gomez et al. | |
| 2005/0289576 A1 | 12/2005 | Challener | |
| 2006/0005216 A1 | 1/2006 | Rausch | |
| 2006/0077787 A1 | 4/2006 | Itagi et al. | |
| 2006/0119983 A1 | 6/2006 | Rausch et al. | |

OTHER PUBLICATIONS

J. A. Hoffnagle et al., "Beam Shaping With a Plano-aspheric Lens Pair", Optical Engineering, vol. 42, No. 11, Nov. 2003, pp. 3090-3099.
W. A. Challener et al., "Miniature Planar Solid Immersion Mirror With Focused Spot Less Than a Quarter Wavelength", Optics Express, vol. 13, No. 18, Sep. 5, 2005, pp. 7189-7197.

* cited by examiner

Primary Examiner—Uyen Chau N Le
Assistant Examiner—John M Bedtelyon
(74) Attorney, Agent, or Firm—Robert P. Lenart, Esq.; Pietragallo Gordon Alfano Bosick & Raspanti, LLP

(57) ABSTRACT

An apparatus includes a planar waveguide, first and second gratings for coupling electromagnetic radiation into the planar waveguide, and a beam shaper for controlling the amplitude distribution of the electromagnetic radiation that impinges on the first and second gratings. A method of coupling electromagnetic radiation into a planar waveguide is also provided.

14 Claims, 5 Drawing Sheets

BEAM APODIZATION FOR A PLANAR SOLID IMMERSION MIRROR

STATEMENT REGARDING FEDERALLY SPONSORED RESEARCH OR DEVELOPMENT

This invention was made with United States Government support under Agreement No. 70NANB1H3056 awarded by the National Institute of Standards and Technology (NIST). The United States Government has certain rights in the invention.

BACKGROUND

In an effort to increase areal density of magnetic storage media, it is desirable to reduce the volume of magnetic material used to store bits of information in magnetic storage media. However, with the available materials, current recording heads are not able to provide a sufficient or high enough magnetic writing field to write on such a medium. Accordingly, it has been proposed to overcome the recording head field limitations by employing thermal energy to heat a local area on the recording medium before, or at about the time of, applying the magnetic write field to the medium. By heating the medium, the coercivity is reduced such that the magnetic write field is sufficient to write to the medium. Once the medium cools to ambient temperature, the medium has a sufficiently high value of coercivity to assure thermal stability of the recorded information.

Heat assisted magnetic recording allows for the use of small grain media, which is desirable for recording at increased areal densities, with a larger magnetic anisotropy at room temperature to assure sufficient thermal stability. Heat assisted magnetic recording can be applied to any type of magnetic storage media, including tilted media, longitudinal media, perpendicular media and patterned media.

For heat assisted magnetic recording, an electromagnetic wave of, for example, visible, infrared or ultraviolet light can be directed onto a surface of a data storage medium to raise the temperature of the localized area of the medium to facilitate switching of the magnetization of the area. Solid immersion lenses (SILs) have been proposed for use in reducing the size of a spot on the medium that is subjected to the electromagnetic radiation. In addition, solid immersion mirrors (SIMs) have been proposed to reduce the spot size. SILs and SIMs may be either three-dimensional or two-dimensional. In the latter case they correspond to mode index lenses or mirrors in planar waveguides. A metal pin can be inserted at the focus of a SIM to guide a confined beam of light out of the SIM to the surface of the recording medium.

A planar solid immersion mirror (PSIM) is a slab waveguide terminated by a parabolic mirror so that an incident slab waveguide mode focuses at the parabolic focus. The input slab waveguide mode is launched by a Gaussian spot incident on the grating coupler, and the amplitude of the slab waveguide mode also has a Gaussian form. Thus, the peak amplitude lies along the symmetry axis of the parabola and the amplitude decays towards the sides. The focal spot for a Gaussian input shows strong side-lobes that are within half a wavelength of the main lobe.

For the design of an integrated heat assisted magnetic recording (HAMR) transducer, it is known that co-location of the near field optical source and the magnetic write field is desirable. To integrate the PSIM in a heat assisted magnetic recording (HAMR) head, the central part of the grating coupler is absent. This is the region where the magnetic pole is present. Thus, it is desirable that the peak intensity of the incident beam does not lie in the region where the pole is present.

SUMMARY

In a first aspect, the invention provides an apparatus including a planar waveguide, first and second gratings for coupling electromagnetic radiation into the planar waveguide, and a beam shaper for controlling the amplitude distribution of the electromagnetic radiation that impinges on the first and second gratings.

In one example, the electromagnetic radiation that impinges on the first and second gratings has a planar phase front. The beam shaper can include first and second plano-acylindrical lenses.

In another aspect, the invention provides a method including providing first and second gratings for coupling electromagnetic radiation into a planar waveguide; and controlling the amplitude distribution of the electromagnetic radiation that impinges on the first and second gratings.

In another aspect, the invention provides an apparatus including a source of electromagnetic radiation, a planar waveguide, first and second gratings positioned adjacent to the planar waveguide, and first and second plano-acylindrical lenses positioned between the source of electromagnetic radiation and the first and second gratings.

These and various other features and advantages will be apparent from a reading of the following detailed description.

DETAILED DESCRIPTION OF THE INVENTION

This invention relates to methods and apparatus for coupling electromagnetic radiation into planar waveguides, and more particularly to such methods and apparatus for coupling electromagnetic radiation into a planar waveguide in a magnetic recording head for heat assisted magnetic recording.

Figure 1:
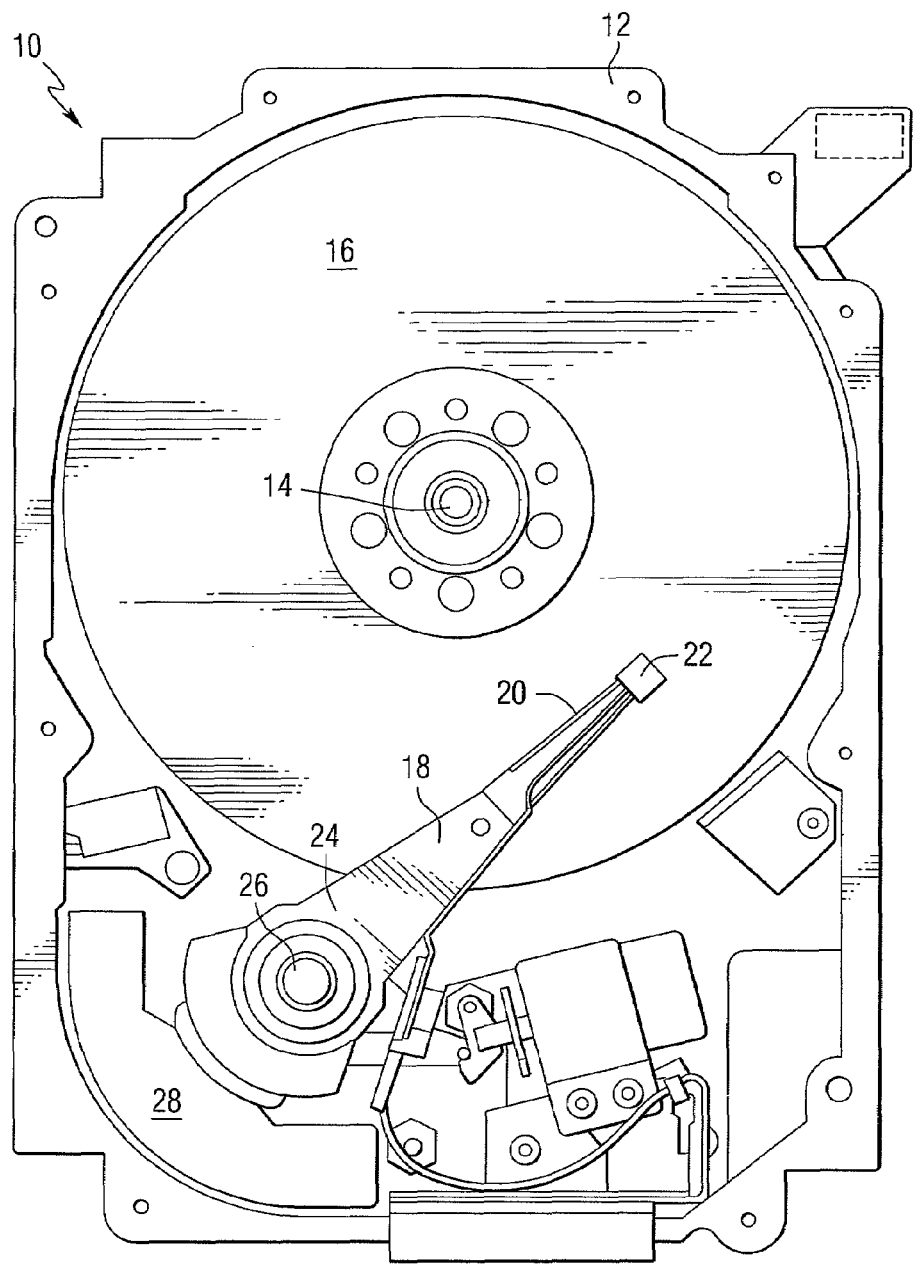
FIG. 1 is a pictorial representation of a magnetic disc drive that can include recording heads constructed in accordance with an aspect of this invention.

FIG. 1 is a pictorial representation of a disc drive 10 that can include an apparatus for coupling electromagnetic radiation into a waveguide constructed in accordance with an aspect of this invention. The disc drive 10 includes a housing 12 (with the upper portion removed and the lower portion visible in this view) sized and configured to contain the various components of the disc drive. The disc drive 10 includes a spindle motor 14 for rotating at least one magnetic storage medium 16 within the housing. At least one arm 18 is contained within the housing 12, with each arm 18 having a first end 20 with a recording head or slider 22, and a second end 24 pivotally mounted on a shaft by a bearing 26. An actuator motor 28 is located at the arm's second end 24 for pivoting the arm 18 to position the recording head 22 over a desired sector or track of the disc 16. The actuator motor 28 is controlled by a controller, which is not shown in this view and is well-known in the art.

Figure 2:
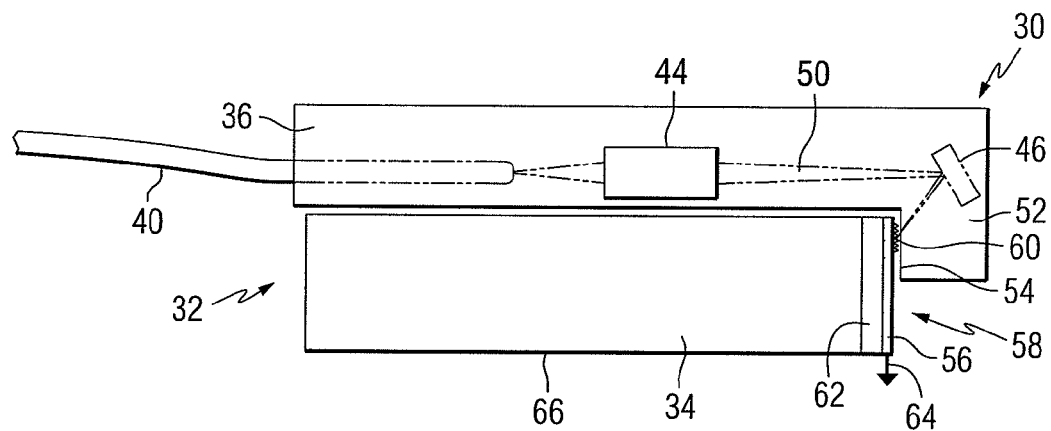
FIG. 2 is a side view of a slider and associated components.

FIG. 2 is a side view of a slider assembly 32 that includes a beam shaping component in accordance with an aspect of the invention. In this example, the slider assembly includes an optical bench 30 that is mounted adjacent to a top surface of a slider 34. The optical bench includes a substrate 36 that is structured and arranged to support an optical fiber 40, a beam shaping component 44, and a mirror 46 for reflecting electromagnetic radiation transmitted through the optical fiber and beam shaping component. The optical fiber serves as a means for directing electromagnetic radiation onto the beam shaping component. A source of electromagnetic radiation, such as a laser, would be used to inject the electromagnetic radiation into the optical fiber. An optical channel 50 is provided for transmission of electromagnetic radiation between the fiber, the beam shaping component, the mirror and a waveguide 56. The electromagnetic radiation can be in the form of infrared, visible light or ultraviolet radiation. For the purposes of this description, such electromagnetic radiation is generically referred to as light. The substrate can be silicon, which has a low cost and well-known processing techniques. Alternatively, the substrate can be, for example, AlTiC, GaAs, SiGe, GaN, GaP, or $Al_2O_3$. An alignment tab 52, having an edge 54, is provided to align the optical bench to the slider. When the optical bench is positioned adjacent to the slider, the alignment edge 54 extends along an end of the slider.

The slider 34 includes an optical transducer in the form of a planar waveguide 56 at one end 58 of the slider and a coupler 60 for coupling light into the waveguide in the form of a grating. The grating can include a plurality of parallel grooves or ridges that extend in a direction substantially parallel to a plane of an adjacent storage medium. A magnetic write pole 62 is located adjacent to the waveguide 56. Light 64 exits from the waveguide at an air bearing surface 66 of the slider. The optical components and relative positions of those components are chosen such that light transmitted through the optical fiber and the beam shaping component, and reflected by the mirror, is focused onto the grating. A portion of the write pole can be positioned adjacent to the focal point of the waveguide.

While FIG. 2 shows one example of a slider including components for transmitting electromagnetic radiation to a waveguide, there are many other known techniques for transmitting electromagnetic radiation to a waveguide. The present invention is not limited to any particular structure other than that specified in the claims.

Figure 3:
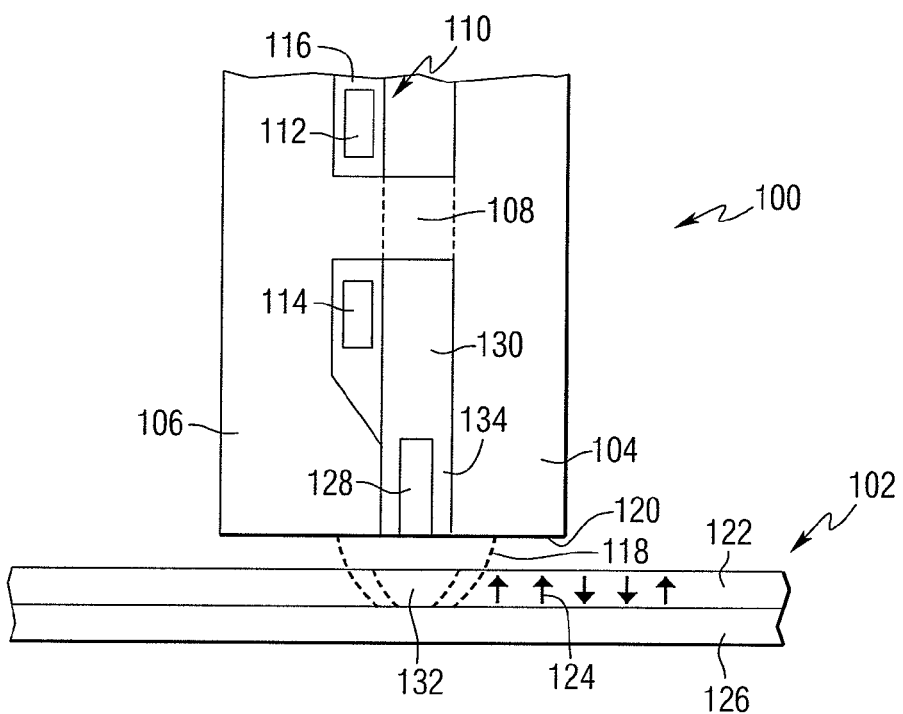
FIG. 3 is a cross-sectional view of a magnetic recording head constructed in accordance with an aspect of this invention, and a portion of an associated magnetic storage medium.

FIG. 3 is a cross-sectional view of a portion of a magnetic recording head 100 that includes a waveguide that receives light from components constructed in accordance with an aspect of this invention, and a portion of an associated perpendicular magnetic storage medium 102. The magnetic recording head 100 includes a write pole 104 and a return pole 106 coupled by a ferromagnetic yoke or pedestal 108. A coil 110 comprising conductors 112 and 114 encircles the pedestal and is supported by an insulator 116. A current in the coil induces a magnetic field in the pedestal and the poles. Magnetic flux 118 exits the recording head at the air bearing surface 120 and is used to change the magnetization of portions of a magnetically hard layer 122 of the storage medium 102, as illustrated by arrows 124. An electric field transducer 128 (also referred to as a near-field transducer), which can take the form of a metallic pin, is positioned between the write pole and the return pole. The storage medium can include a substrate 126. The transducer 128 is coupled to a waveguide 130 that receives an electromagnetic wave from an external source such as a laser. An electric field at the end of the transducer is used to heat a portion 132 of the storage medium to lower the storage medium coercivity so that the magnetic field from the write pole can affect the magnetization of the storage medium. The transducer is electrically isolated from the poles, for example by an insulating layer 134. The insulating layer can be formed by a portion of the waveguide or a separate layer, and can be made of, for example $Al_2O_3$. The composition and thickness of the insulating layer should be selected for optimum performance. The selected thickness will be a function of the pin shape and material composition, as well as the operational wavelength.

For a perpendicular recording data storage device constructed in accordance with an aspect of the invention, a storage medium having a soft underlayer may be used. In addition, in heat assisted magnetic recording media, a heat sink layer may be used to remove heat from the magnetic layer.

In one aspect this invention increases the power of electromagnetic radiation coupled into a planar solid immersion mirror using a split grating coupler.

Figure 4:
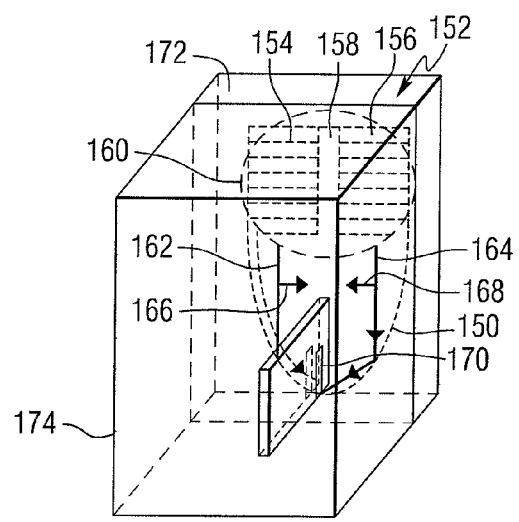
FIG. 4 is an isometric view of a magnetic recording head.

FIG. 4 is an isometric view of another magnetic recording head. The magnetic recording head includes a waveguide that is a component of a solid immersion mirror 150 having a transducer embedded adjacent to an end near the air bearing surface of the recording head. The waveguide includes a dual input grating coupler 152 that is comprised of gratings 154 and 156 separated by a gap 158. A laser beam illustrated by dotted circle 160 is directed onto the gratings and coupled to the waveguide by the gratings to produce electromagnetic waves within the waveguide as illustrated by arrows 162 and 164. The gratings are configured such that the wave illustrated by arrow 164 is phase shifted by 180° with respect to the wave illustrated by arrow 162. Arrows 166 and 168 illustrate the instantaneous electric field of the waves. The waves are reflected off of the parabolic sides of the waveguide and the electric field components of the reflected waves add in the vertical direction at the transducer so that the transducer 170 concentrates the electromagnetic waves near the air bearing surface of the recording head to heat a portion of the magnetic storage medium. The waveguide is shown to be embedded in a cladding layer 172 and mounted on a slider 174.

Recording heads constructed in accordance with various aspects of this invention can incorporate various waveguides to generate focused beams by means of planar solid immersion mirrors. The waveguide in the recording head of FIG. 4 is a two-dimensional waveguide in the form of a solid immersion mirror, including a metal pin embedded in an end of the waveguide. The tip of the pin can extend beyond the waveguide. The waveguide includes edges in this example having a substantially parabolic shape. While FIG. 4 shows a specific example, it should be understood that other recording heads that utilize other types of planar waveguides can also be used.

Due to differences in refractive index between the waveguide and the adjacent material, an electromagnetic wave traveling in the axial direction through the waveguide would be reflected by the waveguide onto the surface of the metal pin. If the electric field at the focal point is parallel to the axis of the pin, then it can couple to the pin and generate surface plasmons along the surface of the pin. Near field radiation then emanates from the tip of the pin. The metal pin placed at the focus concentrates the light to a much smaller spot than would be possible with a mode index lens or SIM alone. The waveguide can be truncated at the end adjacent to the pin so that most of the incoming electromagnetic wave strikes the edges of the waveguide at an angle less than some predetermined angle, such as 45°. For a linearly polarized collimated electromagnetic wave, edges having a parabolic shape will focus the wave to a focal point. However, it should be understood that the edge shape need not be parabolic if the incoming wave is conditioned such that the combination of the wave characteristics and the edge shape results in the desired focusing of the wave at the pin. The pin can have a rectangular cross-section and can be tapered to a point. However, pins having other shapes can also be used.

The waveguide can be made of, for example, a high index dielectric core material like $TiO_2$, $Ta_2O_5$, Si, SiN, or ZnS depending on the wavelength and refractive index desired. For example, Si has a very large index of 3.5 at a wavelength of 1550 nm in the near infrared, but it is not transparent to visible light. $Ta_2O_5$ has a lower index of about 2.1, but is transparent throughout the near infrared and visible spectrum. The waveguide can also contain dielectric cladding layers on either side of the core. The cladding layers have a lower refractive index than the core layer. Preferably the difference in refractive index between the core and cladding should be as large as possible. Air is a suitable dielectric for one side of the cladding. Other dielectrics that could be used as cladding layers include, for example, $SiO_2$ with an index of 1.5 and $Al_2O_3$ with an index of about 1.8.

When the invention is used with either a transverse electric (TE) or transverse magnetic (TM) mode electromagnetic wave, means can be provided to phase shift a portion of the electromagnetic wave. This phase shift can be achieved by providing a means for launching the two-dimensional analog of a radially polarized wave into the planar waveguide. This is called a split linear polarization waveguide mode. Two techniques for achieving the split linear polarization are described here. The first technique modifies half of the planar waveguide by changing the refractive index of the core or cladding dielectrics and/or the thickness of the core or cladding dielectrics in the waveguide in one section. An alternative technique for generating a radially polarized planar waveguide mode makes use of a diffraction grating to launch the planar mode. Diffraction gratings are commonly used to inject light into a planar waveguide. To generate radial polarization, the two diffraction gratings are used with a longitudinal offset between them. The purpose of the dual grating is to introduce a relative 180° phase shift between the two halves of the beam.

From a phase point of view, the PSIM design is optimum in that the rays from a plane front add up in phase at the focus. In the center of the PSIM includes a "dead spot" where no light is launched into the waveguide. To reduce the amount of light that impinges on the dead spot, the amplitude distribution of light delivered to the PSIM can be changed. The focal spot of the PSIM is sensitive to this amplitude distribution.

Figure 5:
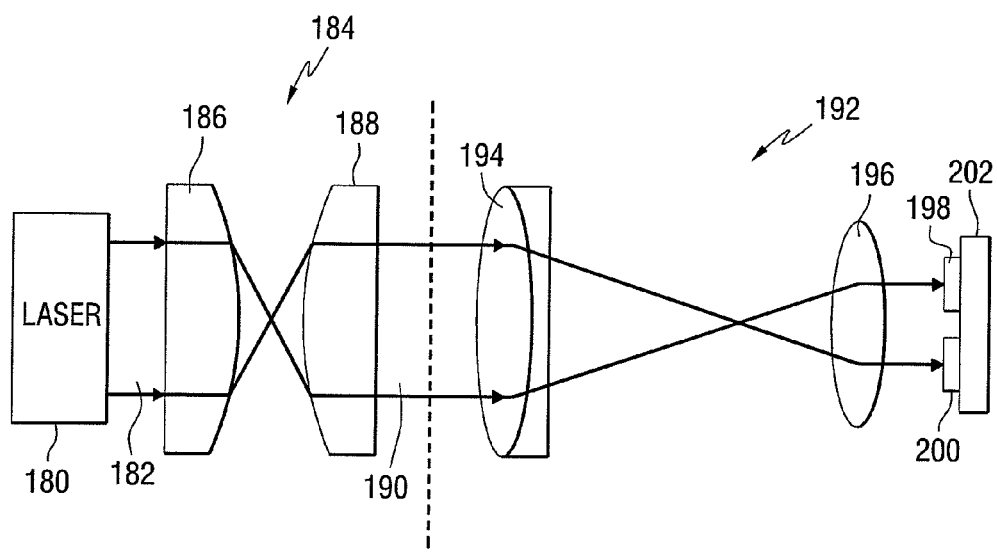
FIG. 5 is a schematic representation of a beam shaping system.

FIG. 5 is a schematic representation of an optical system that can be used to shape the incident beam. A source of electromagnetic radiation, such as a laser 180 produces a beam 182 that is shaped by a beam shaper 184. The beam shaper includes first and second plano-acylindrical lenses 186 and 188 to produce a beam 190 having a planar phase front and an amplitude distribution that reduces the amount of the beam that will impinge on the dead spot of the PSIM. A telescope 192, including lenses 194 and 196 directs the shaped beam onto gratings 198 and 200 to couple the electromagnetic radiation into the PSIM 202.

A Gaussian beam can be shaped into a top-hat amplitude distribution without considerably altering the phase of the beam using two plano-aspheric lenses. Power is conserved in the transformation. The method in principle can shape the Gaussian to any shape. The shape of the aspheric surfaces of the lenses is determined based on the target shape.

In one example, the amplitude profile of the incident beam in one direction is allowed to remain Gaussian. The direction of the beam, which when incident on a coupling grating will correspond to the direction parallel to the PSIM entrance pupil, is the direction in which the lensing is done. A pair of plano-acylindrical lens is used to shape the beam. The shape of the lenses in the plano-acylindrical lens pair can be determined using known techniques. Having used a plano-acylindrical lens pair to obtain a planar phase front with the desired amplitude distribution, the incident beam spot is then directed onto the grating coupler using a set of conventional relay optics.

Figure 6:
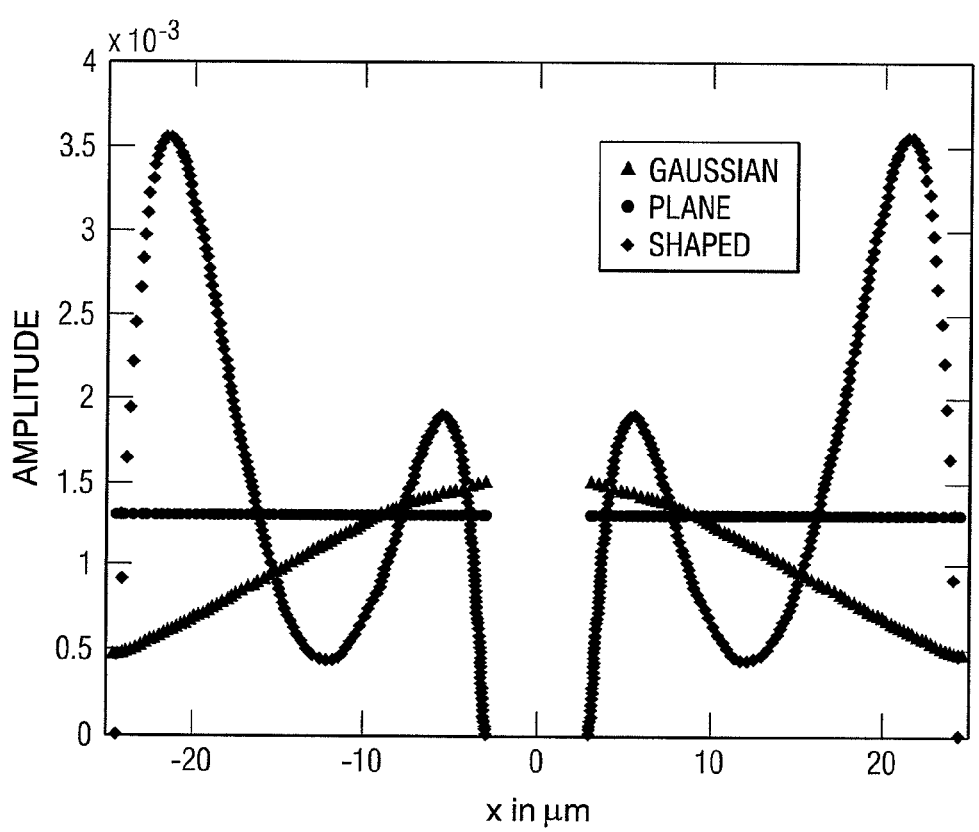
FIG. 6 is a graph of calculated amplitude distributions of an incident beam.

FIG. 6 is a graph of three incident beam amplitude distributions versus distance across a PSIM. The center of the graph, adjacent to 0 on the horizontal axis, is the dead spot of the PSIM. The power falling on the dead spot, or central gap, in the grating is neglected. The gratings would be positioned from about 2 µm to about 23 µm from the center of the PSIM. The shaped beam amplitude profile has two peaks on each grating; one corresponds to the low PSIM spatial frequencies and the other to the high ones.

The shape of the beam amplitude profile was determined using the following procedure. A cost function was first defined such that the focal plane amplitude profiles with desirable features have a lower cost compared to the ones that do not. Since the focal plane amplitude profile is a function of the amplitude profile incident on the grating, the cost function is also a function of the amplitude profile. A numerical minimization procedure was then employed to find an amplitude profile that minimizes the cost function.

FIG. 6 shows one amplitude profile that gives a desirable profile in the focal plane.

The spatial frequency is related to the angle that an incident ray makes with the plane of observation. The field at the focal plane can be thought of as being made up of many incident rays with different angles of incidence. This ray distribution depends on the incident field. If the field has more rays with large spatial frequencies, one expects to see more oscillations in the focal field. Thus the side-lobes will be larger.

Figure 7:
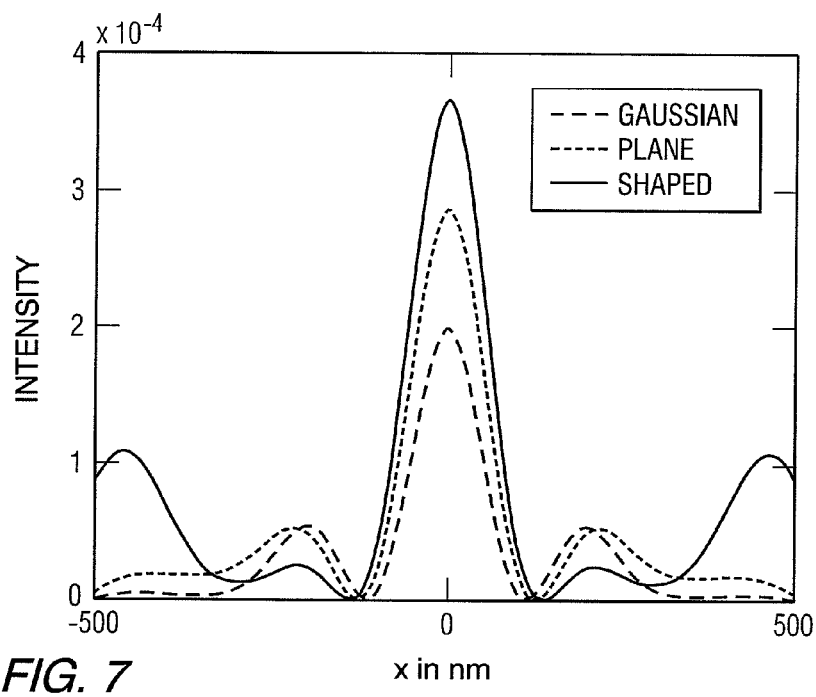
FIG. 7 is a graph of intensity versus distance for several incident beams.
Figure 8:
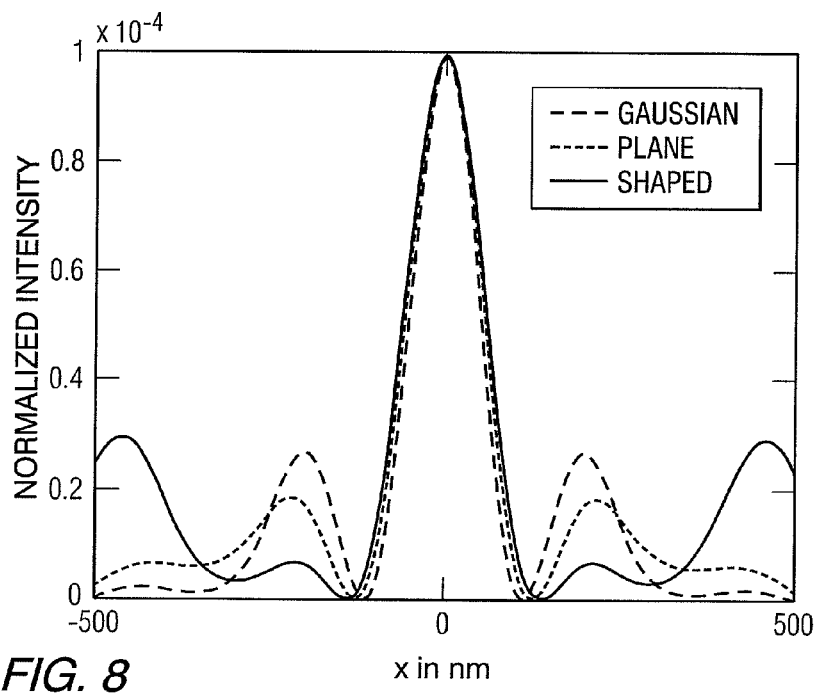
FIG. 8 is a graph of normalized intensity versus distance for several incident beams.

The corresponding focal spot profiles in the focal plane, modeled using a Richards-Wolf model for a perfect conducting reflector, are shown in FIGS. 7 and 8. FIG. 7 shows beam intensity, or power, versus displacement along the width of a planar waveguide for plane, shaped, and Gaussian amplitude distributions. FIG. 8 shows the normalized power that falls on the gratings, not including the power in the gap between the two gratings. Note that for beams with the same power, the peak intensity is higher for the shaped amplitude.

As seen in FIGS. 7 and 8, for the shaped amplitude profile, the power in the first set of side-lobes is considerably reduced. The power in the next set of side-lobes is higher. When the dominant side-lobes are positioned farther from the central lobe, it is more feasible to block the side-lobes with metallic apertures at the air bearing surface of the recording head without altering the focal field profile considerably. The depth of focus is slightly reduced. Nevertheless, HAMR does not have an aggressive depth of focus requirement that optical recording has.

In addition to the apparatus described above, this invention also provides a method comprising: providing first and second gratings for coupling electromagnetic radiation into a planar waveguide, and controlling the amplitude distribution of the electromagnetic radiation that impinges on the first and second gratings.

The electromagnetic radiation can have a planar wave front. As illustrated in FIG. 5, the amplitude distribution of the electromagnetic radiation can be controlled by passing the electromagnetic radiation through first and second plano-acylindrical lenses. As shown in FIG. 6, the amplitude distribution of the electromagnetic radiation that impinges on the first and second gratings can include two peaks on each of the first and second gratings.

In one aspect, the invention seeks to minimize the power incident in the gap between the gratings that couple electromagnetic radiation into a planar waveguide. Beam shaping provides a power conserving transformation of the incident light such that the power in the gap gets diverted to the two gratings.

While the analysis illustrated in FIGS. 7 and 8 relates to the use of the invention with an incident beam having a single polarization, the invention can also encompass a split polarization embodiment, for example, where offset gratings are separated by a gap. In that case, a transducer, such as a pin, can be used to further concentrate the electromagnetic radiation near the focal point of the waveguide.

The implementations described above and other implementations are within the scope of the following claims.

What is claimed is:

1. A method comprising:
   providing first and second gratings positioned to couple electromagnetic radiation into a planar waveguide; and
   passing the electromagnetic radiation through first and second plano-acylindrical lenses to control the amplitude distribution of the electromagnetic radiation that impinges on the first and second gratings, wherein the magnitude of the amplitude distribution of the electromagnetic radiation that impinges on the first and second gratings includes two peaks on each of the first and second gratings.

2. The method of claim 1, wherein the electromagnetic radiation has a planar wave front.

3. The method of claim 1, wherein the first grating is offset with respect to the second grating.

4. The method of claim 1, wherein the amplitude distribution of the electromagnetic radiation that impinges on the first and second gratings goes below 50% of a lower one of the two peaks at ends of the first and second gratings.

5. The method of claim 1, wherein a magnitude of a first one of the peaks is greater than a magnitude of a second one of the peaks.

6. An apparatus comprising:
   a source of electromagnetic radiation;
   a planar waveguide;
   first and second gratings positioned adjacent to the planar waveguide; and
   first and second plano-acylindrical lenses positioned between the source of electromagnetic radiation and the first and second gratings, wherein the first and second plano-acylindrical lenses shape the electromagnetic radiation such that the magnitude of the amplitude distribution of the electromagnetic radiation that impinges on the first and second gratings includes two peaks on each of the first and second gratings.

7. The apparatus of claim 6, wherein the electromagnetic radiation that impinges on the first and second gratings has a planar phase front.

8. The apparatus of claim 6, further comprising:
   a telescope positioned between the first and second plano-acylindrical lenses and the first and second gratings.

9. The apparatus of claim 6, further comprising:
   a recording pole positioned adjacent to the planar waveguide.

10. The apparatus of claim 6, wherein the first grating is offset with respect to the second grating.

11. The apparatus of claim 6, wherein the planar waveguide comprises a solid immersion mirror and the two peaks correspond to spatial frequencies in a focused field of the solid immersion mirror.

12. An apparatus comprising:
    first and second gratings positioned to couple electromagnetic radiation into a planar waveguide; and
    means comprising first and second plano-acylindrical lenses for controlling the amplitude distribution of the electromagnetic radiation that impinges on the first and second gratings, wherein the magnitude of the amplitude distribution of the electromagnetic radiation that impinges on the first and second gratings includes two peaks on each of the first and second gratings.

13. The apparatus of claim 12, wherein the means for controlling the amplitude distribution of the electromagnetic radiation shapes the electromagnetic radiation to a planar wave front.

14. The apparatus of claim 12, wherein the first grating is offset with respect to the second grating.

* * * * *